1. United States Patent [19]

Varpio

[11] 4,283,951
[45] Aug. 18, 1981

[54] MEASURING CUP WITH LEVELER

[76] Inventor: Leonid Varpio, Keskuskatu 23 A, 48100 Kotka 10, Finland

[21] Appl. No.: 70,861

[22] Filed: Aug. 29, 1979

[30] Foreign Application Priority Data

Sep. 4, 1978 [FI] Finland ................................ 782703

[51] Int. Cl.³ ............................................ G01F 19/00
[52] U.S. Cl. ..................................... 73/426; 222/356
[58] Field of Search ............... 141/108, 109, 125, 280; 30/128, 141; 73/425, 425 Z, 426, 429; 222/345, 356, 357, 358, 346

[56] References Cited

U.S. PATENT DOCUMENTS

| 439,432 | 10/1890 | Schoch | 73/426 X |
| 464,393 | 12/1891 | Scheid | 73/426 |
| 544,398 | 8/1895 | Ackerman | 73/429 |
| 1,348,591 | 8/1920 | Shutterly | 73/426 |
| 2,396,943 | 3/1946 | Frank | 73/429 |
| 2,459,466 | 1/1949 | Spreen | 73/426 |
| 2,630,014 | 3/1953 | Chester | 73/429 |
| 3,049,926 | 8/1962 | Victor | 73/429 |

Primary Examiner—David A. Scherbel
Attorney, Agent, or Firm—Steinberg & Raskin

[57] ABSTRACT

Measuring and dispensing apparatus for accurately measuring and dispensing a precise volume of granular material or the like includes a cup portion having an upper rim defined by a downwardly and inwardly tapering side wall and defining a desired interior volume up to the plane defined by the upper edge of the rim, a handle portion having one end thereof fixed to the cup portion and a substantially cylindrical leveler member located over the cup portion having a downwardly and inwardly tapering inner surface which in the normal position of the leveler member forms a substantial extension of the side wall of the upper rim of the cup portion. A mechanism provided for moving the leveler member over the rim of the cup portion and for urging the leveler member back to the normal position. The apparatus is appropriately designed so that any excess granular material is advantageously removed in a manner such that such excess material does not remain on the apparatus.

9 Claims, 4 Drawing Figures

MEASURING CUP WITH LEVELER

BACKGROUND OF THE INVENTION

Many situations occur where a precise volume of granular material must be accurately measured for subsequent dispensing. Thus, such a need often arises in the chemical industry wherein precise amounts of chemicals must be measured as well as in the food industry where, similarly, precise amounts of ingredients must be added in connection with food preparation.

It frequently occurs, however, that when such granular materials are measured utilizing conventional measuring cups or the like, that the quantity of the material obtained is somewhat greater than that desired since the material by its granular nature tends to extend over the upper edges of the cup portion of the measuring cup so a "level" measurement is not obtained.

In one particular application the above-described problem has become particularly acute. More particularly, the price of coffee has recently significantly increased, both in the United States and especially abroad. These price increases have been significant to the point that it is important to consider economy in connection with its preparation. Of course, it is also desirable to measure and dispense a precise volume of coffee in order to obtain the coffee having the best taste. For example, an accurate 15 ml. measure will give one large or two small cups of good tasting coffee.

However, with conventional measuring apparatus, it is difficult to obtain an accurate measure of coffee. It almost invariably occurs that a certain extra amount of coffee is present in any measure and such extra use of the coffee results in economic waste as well as coffee which may be too strong for one's taste.

Attempts have been made to provide measuring apparatus which "level" the measure of granular material. For example, U.S. Pat. Nos. 2,459,466 and 3,049,926 disclose measuring apparatus wherein leveler members are provided over the measuring cup portions. The leveler members are moved over the upper rim of the cup portion to "level" the measure. However, these apparatus are not entirely satisfactory in that the construction of the particular leveler members is such that the entire excess amount of the granular material is not removed in an efficient manner for the reasons, among others, that some granular material gets between the surface of the leveler member and cup portion rim and that the granular material covers the apparatus after the leveling operation is completed.

SUMMARY OF THE INVENTION

Accordingly, one object of the present invention is to provide a new and improved measuring and dispensing apparatus for accurately measuring and dispensing a precise volume of granular material or the like which overcomes the drawbacks described.

Another object of the present invention is to provide a new and improved measuring and dispensing apparatus of the type described above, which is simple in construction and economic in manufacture.

Briefly, in accordance with the present invention, these and other objects are obtained by providing measuring and dispensing apparatus including a cup portion having an upper rim defined by a downwardly and inwardly tapering side wall and defining a desired interior volume up to the plane defined by the upper edge region of the rim and to which is attached one end of the handle portion. A substantially cylindrical leveler member is located over the cup portion having a downwardly and inwardly tapering inner surface which in the normal position of the leveler member forms a substantial extension of the side wall of the upper rim of the cup portion. Apparatus is provided for moving the leveler member over the rim of the cup portion to level the measure contained therein and, additionally, apparatus is provided for urging the leveler member back to the normal position. By the particular construction of the leveler member, an extremely efficient and accurate leveling of the measure is obtained with a minimum of granular material covering the apparatus subsequent to the leveling operation.

DESCRIPTION OF THE DRAWINGS

A more complete appreciation of the invention and many of the attendant advantages thereof will be readily appreciated as the same becomes better understood by reference to the following detailed description when considered in connection with the accompanying drawings in which.

DESCRIPTION OF THE PREFERRED EMBODIMENT

Figure 1:
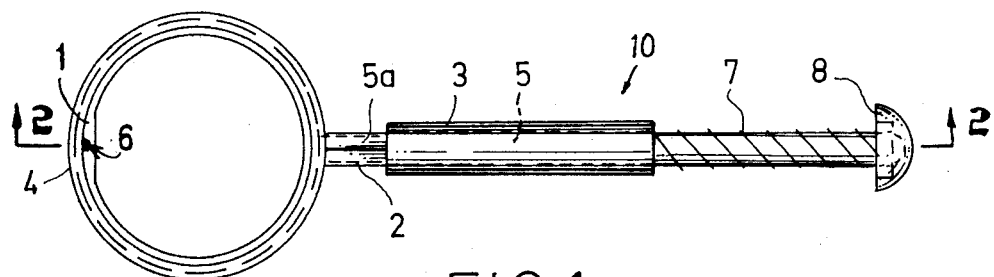
FIG. 1 is a plan view of the measuring and dispensing apparatus of the present invention.

Referring now to the drawings wherein like reference characters designate identical or corresponding parts throughout the several views, a preferred embodiment of the measuring and dispensing apparatus of the present invention, generally designated 10 is illustrated. The apparatus 10 includes a measuring cup portion 1 and a handle portion 3 which is connected to the cup portion 1 by means of a stem portion 2.

In the illustrated embodiment, the cup portion 1 has a downwardly tapering, funnel-shaped configuration which is known per se. The mouth of the cup portion 1 is defined by the upper edge region or rim 11 of the cup portion 1. The upper edge region or rim 11 of cup portion 1 lies in a plane so that when the cup portion 1 is filled with a granular material whose level reaches but does not exceed the plane of the rim 11, the desired precise volume of the material is contained within the cup portion 1.

The handle portion 3 has a through bore 9 formed therein, the axis of the bore extending above the plane defined by the upper edge portion 11 of cup portion 1.

Figure 4:
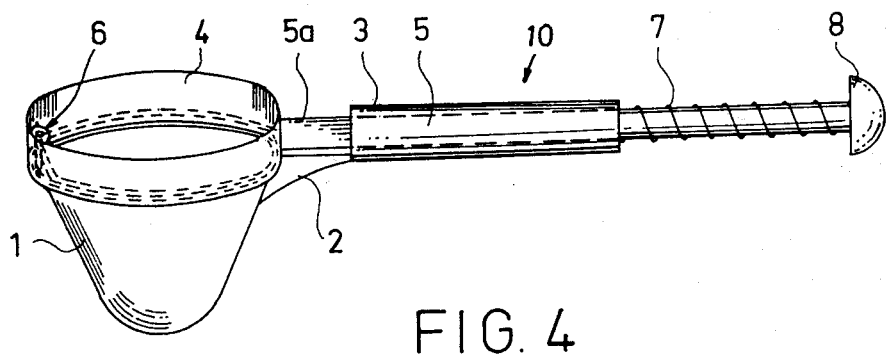
FIG. 4 is a perspective view of the measuring and dispensing apparatus of the present invention.

According to the invention, a substantially cylindrical or ring-shaped leveler member is located over the cup portion and has a downwardly and inwardly tapering inner surface thereby defining a substantially truncated cone configuration. In the normal position the leveler member as illustrated in the figures the inner surface thereof forms a substantial extension of the side wall of the rim of the cup portion 1. Thus, when the leveler member 4 is in its normal position as seen in FIGS. 1, 2 and 4, it does not obstruct the mouth of the cup portion.

Figure 3:
FIG. 3 is a section view taken along line 3—3 of FIG. 2.

The leveler member 4 is mounted for movement over the cup portion 1 substantially contiguous to the upper edge region or rim 11 thereof in a direction parallel to the plane in which the rim lies. More particularly, a rod 5 is slidably disposed within bore 9 and has one end thereof fixed to the outer surface of leveler member 4. Rod 5 has a circular cross section except for the portion designated 5a overlying the stem portion 2 which has a substantially triangular cross section as seen in FIG. 3. A spring 7 is provided over the outer end of rod 5, one end of which abuts the end surface of handle 3 with the other end thereof abutting against a knob 8 fixed to the free end of rod 5.

A stop member 6 in the form of a wire or pin is fitted within a hole formed in the marginal interior region of the cup portion 1 and functions to engage and position the leveler member 4 in its normal position as illustrated in the figures against the force of spring 7.

Figure 2:
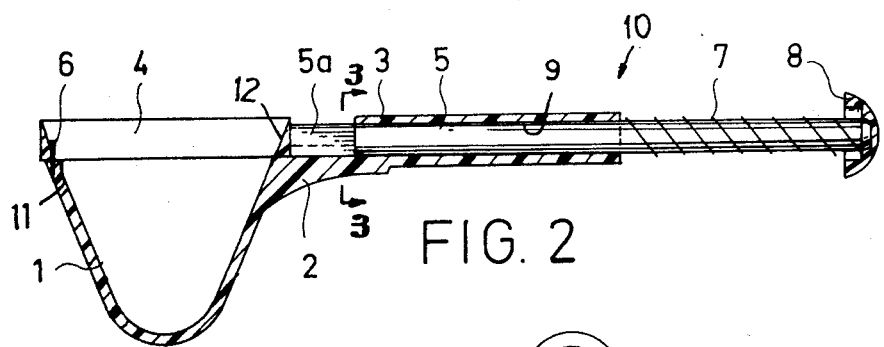
FIG. 2 is a section view taken along line 2—2 of FIG. 1.

As seen in FIGS. 2 and 3, the body of the stem protion 2 is substantially entirely located below the plane of the free edge of the rim of the cup portion 1 so that rod moves over the stem portion. As best seen in FIG. 3, the stem portion body and triangular cross-section of the rod portion 5a have convex upper and lower surfaces, respectively, which substantially pass through the plane of the free edge of the rim of the cup portion. Further the lower surface of the triangular rod cross-section has a breadth which completely overlies the stem portion.

In construction, the rod 5 is inserted into the bore 9 of handle 3 and the leveler member 4 located so that its inner sides 12 are aligned with the inner surface of cup portion 1 whereupon the stop 6 is inserted into its receiving bore where it is held by conventional means, such as by a small quantity of glue. Alternatively, stop member 6 may be provided prior to assembly of rod 5 into bore 9 in which case the cup portion 1 is bent slightly downwardly at stem 2 so that the rod 5 can be inserted through the bore 9 of handle 3 with the step 6 being located within the leveler member ring. In this connection, it is preferable for the handle 3 and stem 2 to be formed of a resilient plastic material to allow for the flexing described above. The spring 7 is located over the rearward length of rod 5 whereupon the knob 8 is affixed to the end of the rod by conventional means, such as by gluing.

In one typical embodiment of the present invention, the cup portion 1 had an inner diameter (at its rim 11) of 38 mm, an outer diameter of 40 mm and a depth of 30 mm. The stem 2 has a length of 10 mm and a breadth of 5.5 mm, whereas handle portion 3 had a diameter of 10 mm and a length of 45 mm. The bore 9 was formed having a diameter of 5.6 mm. In this connection, it was found preferable to form the cup portion 1, stem 2 and handle portion 3 as an integral assembly. The ring-shaped leveler member 4 had a height of 6.5 mm and an inner diameter measured at the lower or leveling edge thereof of 39 mm with an outer diameter of 41 mm. The rod 5 had a diameter of 5.5 mm in diameter having a height of 3 to 4 mm measured from the surface of the cup portion 1. The spring 7 was formed of a 0.3 mm diameter wire having a pitch of 6 mm.

In operation, the apparatus is grasped in a manner such that the index finger is left free whereupon the granular material is scooped from its container, the latter entering the cup portion 1 through the leveler member 4 which is located in its normal unobstructing position illustrated in the figures. The knob 8 is then pressed with the index finger so that the leveler member 4 moves forwardly over the rim 11 of cup portion 1 thereby removing any excess granular material which extends above the plane defined by the rim 11 of cup portion 1. The granular material which is removed falls through the space defined between the outer surface of the cup portion 1 and the inner surface of the leveler member 4. Upon releasing the knob 8, the rod 5 returns under the urging of spring 7 to the position illustrated in the figures whereupon the leveler member 4 returns to its normal position, any remaining excess granular material being removed at this time. As noted above, the section 5a of rod 5 is formed having a triangular cross section (FIG. 3), the apex of which faces upwardly. This configuration has been found advantageous in that any excess granular material removed in the direction of handle 3 and stem 2 will slide downwardly thereover.

The inwardly tapering configuration of the inner sides 12 of leveler member 4 further facilitates the removal of the excess granular material by lifting the same to some extent during the movement of leveler member 4 as described above. After the reciprocating motion of the leveler member 4 is accomplished, i.e. after the leveler member is moved forwardly through the application of a pressure on the end of rod 5 and allowed to return to its normal position under the action of spring 7, no granular material will remain on the surface of the apparatus 10 by virtue of the particular structure of the same described above.

By constructing the leveler member 4 in a manner described above, i.e. in a substantially cylindrical form wherein its inner surface tapers in a downward and inward direction in a manner such that it forms a substantial extension of the side wall of the upper rim of the cup portion, the drawbacks of conventional measuring apparatus provided with leveler members as discussed above are overcome. More particularly, the downward and inward configuration of the conical inner surface of the leveler member act as lifters or shovels which insure that all of the excess granular material is removed in a manner such that none of this material can remain between the leveler member and the cup portion rim. Unlike prior apparatus, the leveler member facilitates the initial scooping of the granular material into the cup portion by providing a guide surface therefor. The leveler member cannot act to "catch" any granular material during the initial scooping or subsequent to the leveling operation. When the leveler member is in its normal position as described above, the apparatus resembles a conventional measuring cup and can be constructed in a smaller configuration than would be otherwise possible.

Obviously, numerous modifications and variations of the present invention are possible in the light of the above teachings. Accordingly, it is understood that the invention may be practiced otherwise than as specifically disclosed herein.

What is claimed is:

1. Measuring and dispensing apparatus for accurately measuring and dispensing a precise volume of granular material or the like, comprising:
   a cup portion having a peripherally extending rim defining a mouth of said cup portion, said rim having a free edge lying in a plane and wherein said cup portion includes a side wall defining with said plane a desired interior volume;
   an elongate handle portion extending from said cup portion, said handle portion having a longitudinally extending bore formed therein:
   a leveler member including a ring-shaped member having an inner surface in the shape of a truncated cone, the edge of said inner surface which defines the minor base of the truncated cone substantially conforming to the configuration of the free edge of said cup portion rim and being contiguous thereto in the normal position of said leveler member;

an elongate rod slidably located in said handle portion bore having one end thereof connected to said ring-shaped leveler member; and spring means located over said elongate rod for urging said leveler member back to the normal position after the latter has been displaced therefrom during operation;

whereby when said leveler member is in normal position said inner surface thereof functions as a funnel to facilitate filling said cup portion and when said elongate rod is urged in its longitudinal direction against the force of said spring means to move said leveler member for said normal position, surplus granular material is lifted onto and carried by said conical inner surface thereof so that the material which remains in the cup portion interior fills the same precisely to said plane of the free edge of the rim thereof.

2. Apparatus as recited in claim 1 wherein said handle portion has a free end distal from said cup portion and a knob portion is provided on the other end of said rod, and wherein said spring means comprises a helical spring having one end abutting the free end of said handle portion and another end abutting said knob portion.

3. Apparatus as recited in claim 1 wherein said handle portion is connected to said cup portion through an intermediate stem portion, the latter including a body which is substantially entirely located below the plane of the free edge of the rim of said cup portion, said rod being slidably located in said bore to move over said stem portion.

4. Apparatus as recited in claim 3 wherein at least the portion of said rod which is located over said stem portion is formed with a substantially triangular cross section defining an upwardly facing apex.

5. Apparatus as recited in claim 4 wherein said body of said stem portion has a convex upper surface substantially passing through the plane of the free edge of the rim of said cup portion and said substantially triangular cross-section of said rod portion is formed with a convex lower surface substantially passing through the plane of said free edge of the rim of said cup portion.

6. The apparatus as recited in claim 5 wherein said lower surface of said substantially triangular rod cross section has a breadth which completely overlies said stem portion.

7. Apparatus as recited in claim 1 further including means for retaining said leveler member in its normal position against the force of said spring.

8. Apparatus as recited in claim 7 wherein said retaining means comprise a stop pin affixed to said rim and extending through the plane of the free edge thereof so as to engage the inner surface of said leveler member when the latter is in its normal position so as to retain the same in its normal position against the force of said spring means.

9. The combination of claim 1 wherein the inner surface of said cup portion has a conical configuration and wherein said conical inner surface of said leveler member forms a substantial continuation of said inner surface of said cup portion when the leveler member is in the normal position.

* * * * *